UNITED STATES PATENT OFFICE 2,438,751

TETRALYL COMPOUNDS

Franklin D. Jones, Upper Darby, Pa., assignor to American Chemical Paint Company, Ambler, Pa., a corporation of Delaware No Drawing. Application May 13, 1941, Serial No. 393,248

4 Claims. (Cl. 260—454)

The present invention relates to tetralyl-6-acetonitrile and certain of its derivatives such as tetralyl-6-acetamide, tetralyl-6-acetic acid and its lower esters and alkali metal salts, the thiocyanate and isothiocyanate.

All of the foregoing substances are new chemical individuals, and, as will hereinafter be pointed out in greater detail, possess the remarkable property of being able to influence, regulate and control the growth of plants, even when present in minute concentration. They are, therefore, plant hormones.

Tetralyl-6-acetonitrile, which may also be termed 1.2.3.4-tetrahydro-naphthalene-6-acetonitrile, has the following structural formula:

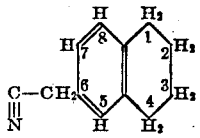

The amide, which may be termed either tetralyl-6-acetamide or 1.2.3.4-tetrahydro-naphthalene-6-acetamide, corresponds to the following formula:

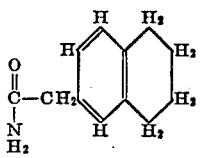

Tetralyl-6-acetic acid, which may also be termed 1.2.3.4 - tetrahydro-naphthalene-6-acetic acid, has the following structural formula:

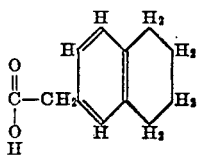

The esters of tetralyl-6-acetic acid have the following general formula:

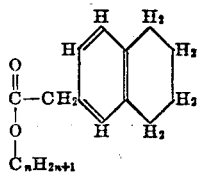

For instance the formula of the methyl ester is:

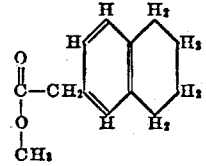

The alkali metal salts of tetralyl-6-acetic acid have the following general formula:

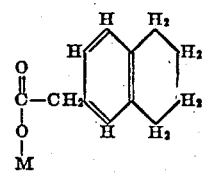

in which M is an alkali metal such as sodium, potassium, or ammonium (ammonium being considered as an alkali metal).

The thiocyanate has the following structural formula:

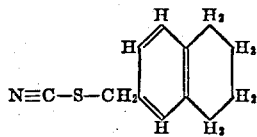

The isothiocyanate has the following formula:

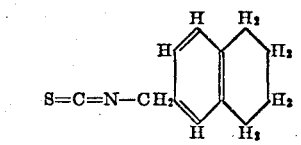

From the foregoing, it is thought to be clear that the compositions of the present invention can be considered as having the structural formula:

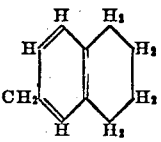

in which X is selected from the group consisting of Cn, $CONH_2$, COOH, COOY in which Y is an alkyl group or an alkali metal, $S—C\equiv N$ and $N=C=S$ All the foregoing compounds may be produced from either tetralin (1.2.3.4-tetrahydro-naphthalene) or tetralyl-6-methyl chloride. If tetralin is used as the starting material, it is first chlormethylated in accordance with the disclosure of my Patent No. 2,212,099, issued August 20, 1940, to produce tetralyl-6-methyl chloride.

Starting with tetralyl-6-methyl chloride, tetralyl-6-acetonitrile can be readily made by reacting with sodium cyanide (NaCN) or potassium cyanide (KCN). The acetonitrile is a clear, colorless, viscous liquid having a boiling point of 150–155° C. at a pressure corresponding to 2 mm. of mercury.

The amide can be made by partially hydrolyzing the acetonitrile with caustic soda. The acid (tetralyl-6-acetic acid) can be made by carrying the hydrolysis to completion, and acidifying the solution.

Both the amide and acid are crystalline solids. The amide has a melting point of 147° C., and the acid has a melting point of 109–114° C.

The esters of tetralyl-6-acetic acid may be readily made by reacting tetralyl-6-acetonitrile or -acetic acid with the alcohol corresponding to the desired ester in the presence of sulphuric acid. For instance, the methyl or ethyl ester may be produced by reacting tetralyl-6-acetonitrile with methyl or ethyl alcohol respectively. The methyl ester is a liquid boiling at 135–140° C. under a pressure corresponding to 1–2 mm. of mercury, and the ethyl ester boils at 140–145° C. under the same pressure.

The alkali metal salts may be made by reacting tetralyl-6-acetic acid with the hydroxide or carbonate corresponding to the desired salt. Thus, the sodium or potassium salt may be made by treating the acid with sodium or potassium hydroxide or carbonate, and the ammonium salt may be made by reacting the acid with ammonia. The sodium or potassium salt may also be made by completely hydrolyzing tetralyl-6-acetonitrile with sodium or potassium hydroxide. As above stated, tetralyl-6-acetic acid may be made by acidifying the product obtained by completely hydrolyzing the acetonitrile.

The alkali metal salts are white crystalline substances, which are readily soluble in water.

The thiocyanate, i. e. tetralyl-6-methyl thiocyanate, may be made in the following manner:

Tetralyl-6-methyl chloride and an alkali thiocyanate, such as potassium, sodium or ammonium thiocyanate, in substantially molecular proportions, are mixed with three to four times their volume of methyl, ethyl, isopropyl or other alcohol, and refluxed for about an hour. At the end of the reaction, the hot mixture is poured into about four times its volume of cold water, thereby dissolving the alkali chloride salt which separated during the reaction, and precipitating tetralyl-6-methyl thiocyanate. The product is washed several times with hot water, and is finally poured into hot methanol for crystallization.

The thiocyanate is a clear white liquid, which does not crystallize even at —10° C., and which is partially converted on distillation into the isothiocyanate.

The isothiocyanate can be readily obtained by heating the thiocyanate. The isothiocyanate can be separated from the unreacted thiocyanate by fractional distillation under a vacuum, or by extracting the thiocyanate with methanol and thereafter extracting the isothiocyanate from the tarry residue with ether.

The isothiocyanate is a water-white liquid when freshly made, having a boiling point of 168–174° C. at 1 to 2 millimeters pressure. It turns dark brown in contact with air or on standing.

The tetralyl derivatives of the invention are, as has been stated, plant hormones. The tetralyl compounds, particularly tetralyl-6-acetamide, have the advantage over previously known plant hormones in that they are decidedly less toxic to plant life, and hence much safer to use. The thiocyanate and isothiocyanate, in addition to being plant hormones, are very effective as insecticides and fungicides. They are particularly deadly to flies and aphis, when applied in the form of a spray.

Referring to the activity of the compositions as plant hormones, it may be stated that they are effective in stimulating the rooting of cuttings and of seedlings. The stimulation of the rooting of seedlings may advantageously be effected by treating the seeds prior to planting. The tetralyl derivatives show considerable activity in inhibiting bud formation, and in prolonging the life of fruit and vegetables in storage.

The compositions of the invention may be applied in the form of solutions or emulsions, or as a vapor or very fine spray with or without a solvent or dispersing agent. They may be used either separately or together as ingredients in insecticidal and fungicidal compositions containing other active or inert ingredients. For instance, an insecticidal or fungicidal composition may contain in addition to one or more of the tetralyl derivatives, a solvent and a wetting agent such as a sulphonated alcohol of the fatty series having from eight to thirty carbon atoms. The composition may contain other substances having fungicidal or insecticidal activity with or without other ingredients having other functions, such as for instance, other plant hormones.

As has been stated, the tetralyl derivatives may be applied in the form of emulsions. Oils or fats of either vegetable, animal or mineral origin such as olive oil, castor oil, lanolin, or petroleum oil, etc., may be used as vehicles or dispersing agents.

The tetralyl derivatives may also be applied in dry form in admixture with powdered fillers such as talc, bentonite, clay, kaolin, charcoal, ground carbon, wood flour, etc. Other dry ingredients, as for example, sulphur, may also be mixed in.

The tetralyl derivatives of the invention, singly or in admixture with each other or with other active or inert ingredients, with or without a solvent or dispersing agent, may be applied in the form of a vapor or very fine spray, particularly in a confined space, such as a hot house or storage room.

The compositions may be applied for the eradication of fungi, parasitic diseases due to fungi and plant insects in at least one of the following ways:

1. To the seeds or bulbs before sowing or planting.
2. To the soil before or after planting.
3. To the seedlings when they have barely emerged.
4. To the growing or dormant plants.
5. To the fruit or flowers either on or off the plant.

When used as plant hormones, the tetralyl derivatives may be applied in concentrations as low as one part in 1,000,000 parts of aqueous or oleaginous vehicle, and in concentrations as high as one part in 1000 parts of alcoholic or oleaginous vehicle. When applied in the form of powders or dusts, the range of concentration is from one part of tetralyl derivative in 10,000 parts of composition to one part of tetralyl derivative in 100 parts of composition.

The tetralyl derivatives may be used in compositions containing other substances having some particular effect on plant life such as nutrients, fertilizers, vitamins, or substances which form vitamins in situ or which facilitate the production of vitamins in the plant. The added ingredients may, as has been stated, be plant hormones. The added hormones may be either the natural hormones such as auxin a, auxin b, and hetero-auxin (indole-acetic acid), or any one or more of the synthetic hormones such as phenyl, naphthyl, indole, fluorene, anthracene, naphthoxy and acenaphthene acetic, propionic and butyric acids, naphthyl-hexoic and indole-valeric acids, and the amides, thioamides, nitriles, lower alkyl esters and alkali metal and ammonium salts of said acids. As additional examples of synthetic plant hormones that may be added to the tetralyl derivatives may be mentioned 1-naphthyl methyl thiocyanate and its isomer, 1-naphthyl methyl isothiocyanate, which may be made as disclosed in my copending application Serial No. 378,975, filed February 14, 1941, now U. S. Patent No. 2,394,915, issued Feb. 12, 1946, as well as the 1-methyl and 2-methyl naphthalene derivatives disclosed in my application Serial No. 393,249, filed concomitantly herewith, now abandoned.

The compositions of this invention may be applied as growth regulating substances to plants in any one or more of the ways known to the art.

The term "plants" as used in the present disclosure and the appended claims is intended to include plants, slips, leaf cuttings, stem cuttings, scions, tubers, roots, seeds, bulbs, seedlings, buds, fruit and flowers, wherever the context permits.

The invention has been disclosed with the particularity and exactness required by the Patent Statutes, and it will be understood that the foregoing disclosure is illustrative and that many changes may be made therein without departing from the spirit or scope of the hereunto appended claims, in which I have endeavored to claim all the patentable novelty inherent in the invention.

I claim:

1. The substance selected from the group consisting of tetralyl-6-acetonitrile, tetralyl-6-acetic acid, the lower esters and alkali metal salts of said acid, tetralyl-6-acetamide, tetralyl-6-methyl thiocyanate and tetralyl-6-methyl isothiocyanate.

2. Tetralyl-6-acetonitrile.

3. Tetralyl-6-acetamide.

4. The substance selected from the group consisting of tetralyl-6-methyl thiocyanate and tetralyl-6-methyl isothiocyanate.

FRANKLIN D. JONES.

REFERENCES CITED

The following references are of record in the file of this patent:

UNITED STATES PATENTS

| Number | Name | Date |
| --- | --- | --- |
| 2,051,460 | Skrbensky | Aug. 18, 1936 |
| 2,122,781 | Salzberg | July 5, 1938 |
| 2,124,400 | Heckert et al. | July 19, 1938 |
| 2,166,554 | Roblin et al. | July 18, 1939 |
| 2,185,237 | Weijlard et al. | Jan. 2, 1940 |
| 2,213,809 | Dustman | Sept. 3, 1936 |

FOREIGN PATENTS

| Number | Country | Date |
| --- | --- | --- |
| 325,910 | Great Britain | 1929 |

OTHER REFERENCES

Behrend et al., "Annalen," vol. 344, pp. 24–25.
Braun et al., "Berichte," vol. 55B, pp. 3669 and 3672 to 3674.
Henry, "Berichte," vol. 2, p. 637.
Willstatter, "Berichte," vol. 51, p. 775.